July 9, 1940.  F. M. DAVIS  2,206,882
ELECTRICAL CONTROL APPARATUS
Filed April 18, 1938   3 Sheets-Sheet 1
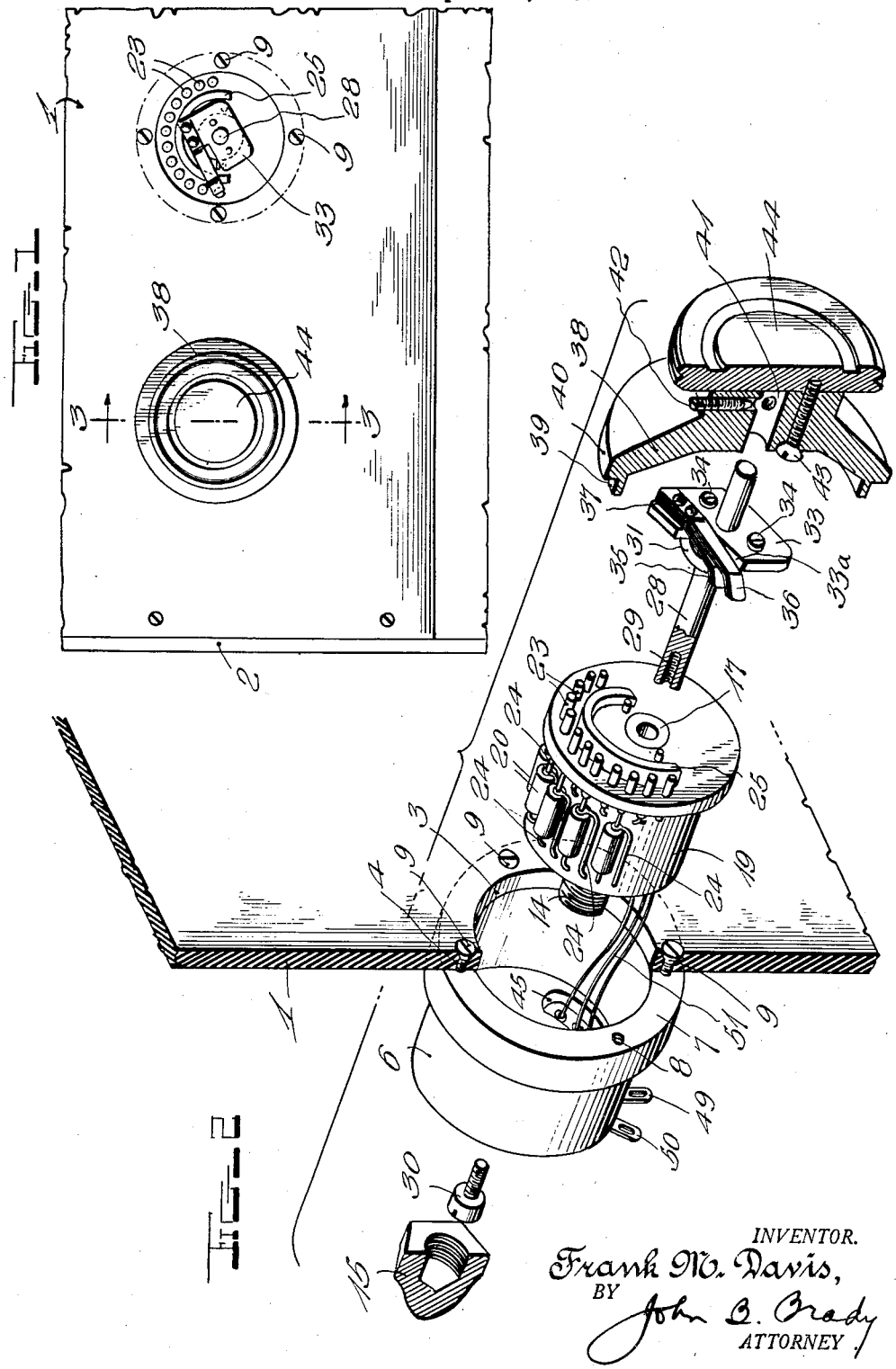
INVENTOR.
Frank M. Davis,
BY
John B. Brady
ATTORNEY.

July 9, 1940.  F. M. DAVIS  2,206,882
ELECTRICAL CONTROL APPARATUS
Filed April 18, 1938   3 Sheets-Sheet 2
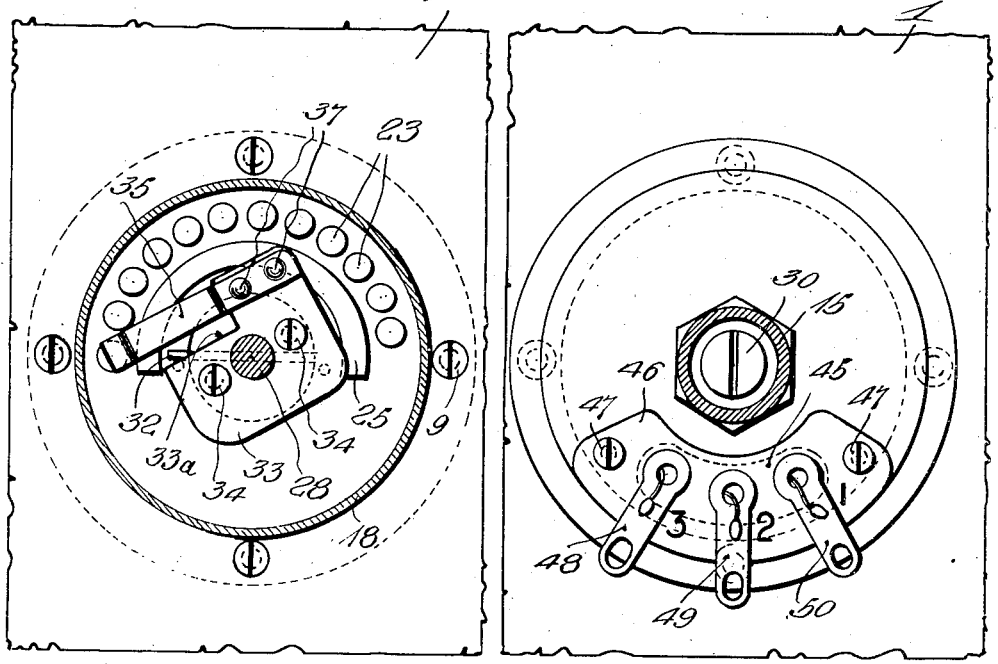
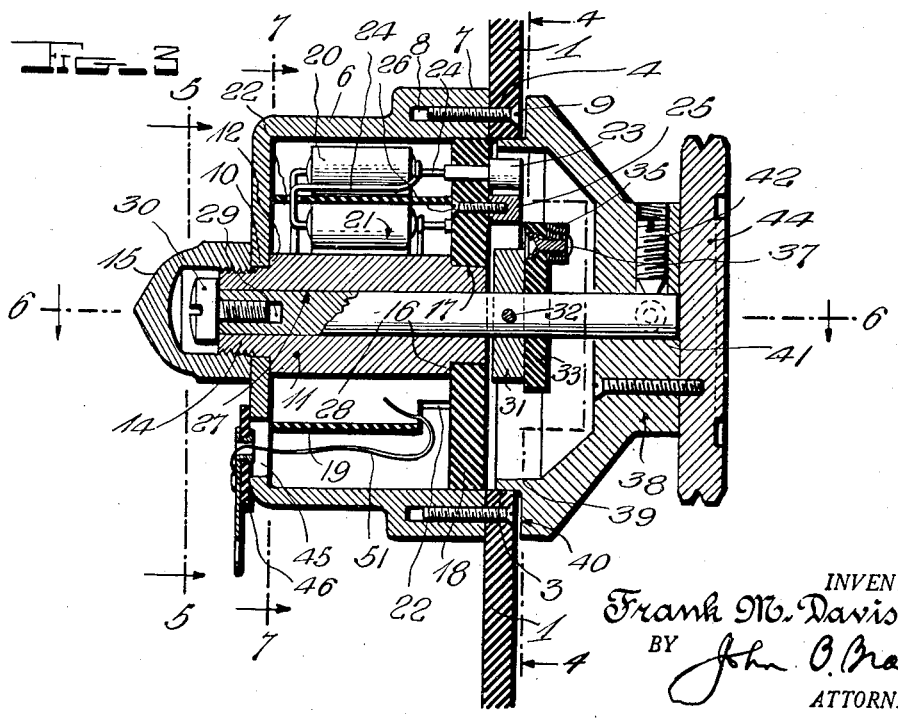
INVENTOR.
Frank M. Davis,
BY John O. Brady
ATTORNEY July 9, 1940. F. M. DAVIS 2,206,882
ELECTRICAL CONTROL APPARATUS
Filed April 18, 1938 3 Sheets-Sheet 3
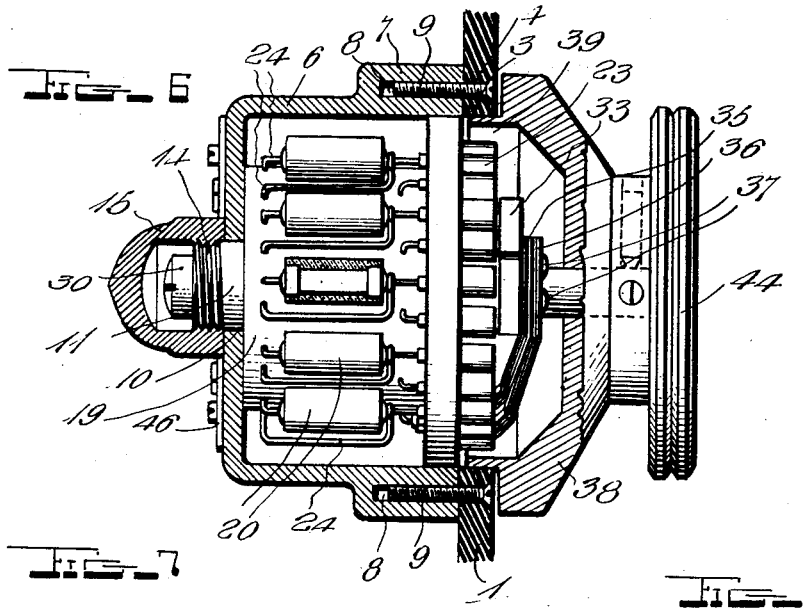
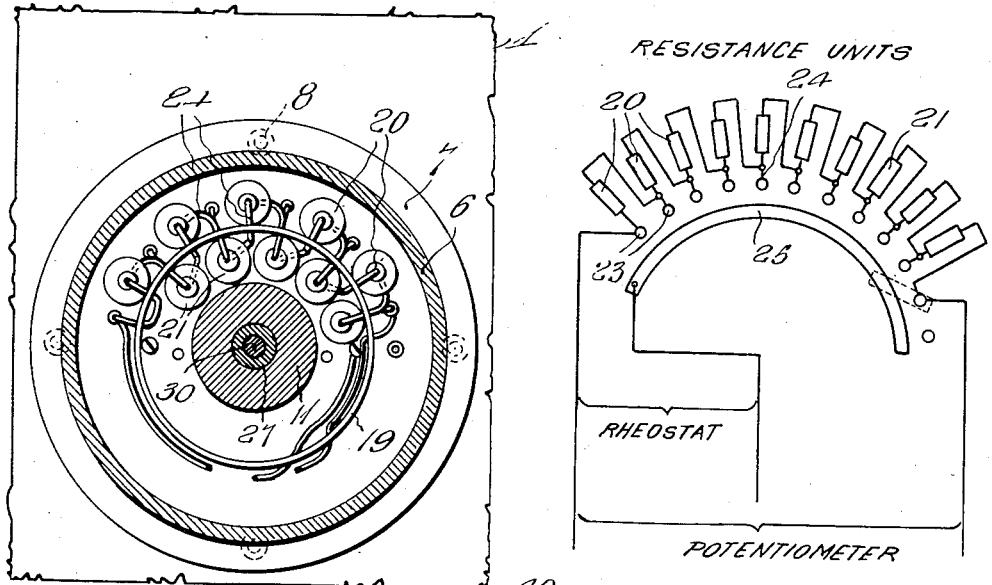
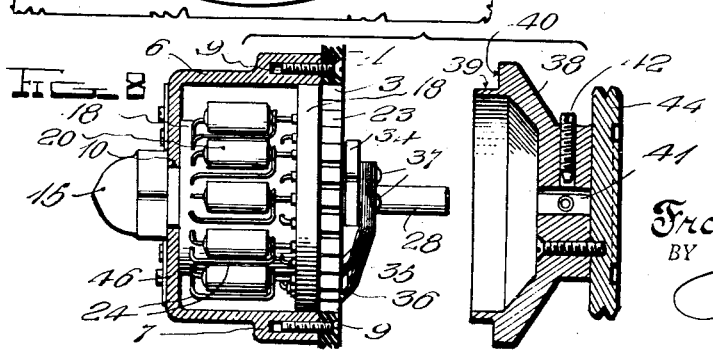
INVENTOR.
Frank M. Davis,
BY John C. Brady
ATTORNEY.

Patented July 9, 1940

2,206,882

UNITED STATES PATENT OFFICE 2,206,882

ELECTRICAL CONTROL APPARATUS

Frank M. Davis, Cedar Rapids, Iowa, assignor to Collins Radio Company, Cedar Rapids, Iowa, a corporation of Iowa Application April 18, 1938, Serial No. 202,814

5 Claims. (Cl. 201—48)

My invention relates broadly to electrical control apparatus and more particularly to a construction of variable electric controller which may be readily mounted with respect to a panel structure and in which parts of the controller are accessible from the front of the panel upon removal of the control knob from the actuating shaft of the control apparatus.

One of the objects of my invention is to provide an improved construction of control apparatus which is readily adapted for panel mounting whereby parts of the control apparatus are accessible from the front of the panel upon removal of the actuating knob from the control shaft of the apparatus.

Another object of my invention is to provide a construction of electrical control apparatus in which the housing for the apparatus may be supported from the rear of a panel construction with parts of the control apparatus within the housing readily accessible from the front of the panel structure upon removal of the control knob from the operating shaft of the apparatus.

A further object of my invention is to provide a construction of electrical control apparatus having a housing supportable from a panel structure in alignment with an apertured portion of the panel through which parts of the control apparatus are readily accessible from the front of the panel structure and wherein the angularly adjustable control knob for the apparatus serves as a closure for the housing of the apparatus.

Another object of my invention is to provide an improved manner of mounting a multiplicity of electrical elements within an apparatus housing and establish electrical connection therewith by means of an angularly movable contactor shiftable over a multiplicity of fixed contact members.

A further object of my invention is to provide a structure of insulated support for a multiplicity of electrical elements housed within a metallic casing in such manner that substantial electrical insulation may be assured.

A further object of my invention is to provide a construction of mounting means for a plurality of fixed contacts carried by an insulated panel member mounted in a metallic casing and serving as a support for electrical circuit elements substantially insulated from the casing.

A further object of my invention is to provide a construction of control shaft and resilient contactor system for an electrical control apparatus by which selective electrical connection may be established with a multiplicity of fixed contacts by means electrically insulated from the control shaft of the apparatus.

Still another object of my invention is to provide a control apparatus having a revolvable shaft member electrically grounded with respect to the casing of the apparatus but carrying a contact member insulated therefrom and adapted to establish selective electrical connection with a multiplicity of fixed contacts in step by step progression.

Other and further objects of my invention reside in the construction of adjustable contact system and mounting means therefor as set forth more fully in the specification hereafter following by reference to the accompanying drawings in which:

Figure 1 is an elevational view showing a panel structure of an apparatus equipped with the electrically controlled apparatus of my invention and illustrating one apparatus constructed in accordance with my invention with the control knob removed and a similar apparatus with the control knob in position; Fig. 2 is a perspective view of the electrical control apparatus of my invention illustrating the several parts thereof in alignment and showing the manner in which the parts are adapted to interfit; Fig. 3 is a vertical sectional view taken through the control apparatus of my invention with certain of the parts illustrated in side elevation; Fig. 4 is a transverse sectional view taken on line 4—4 of Fig. 3; Fig. 5 is a transverse sectional view taken on line 5—5 of Fig. 3; Fig. 6 is a longitudinal sectional view taken on line 6—6 of Fig. 3; Fig. 7 is a transverse sectional view taken on line 7—7 of Fig. 3; Fig. 8 is a longitudinal sectional view with parts shown in side elevation and illustrating the knob structure which also serves as a closure member removed from engagement with the control shaft; and Fig. 9 is a circuit diagram showing the one type of electrical circuit to which the electrical control apparatus of my invention may be applied.

My invention is particularly adapted as an attenuator used as a volume control in broadcast studios but the applications of the structure of my invention are numerous and in illustrating my invention as applied to an attenuator, I do not intend any limitations to be imposed thereon. The electrical control apparatus of my invention is characterized by the convenience with which repairs and adjustment may be made in the mechanism. I provide a housing for the apparatus which may be readily supported from the rear of a panel structure through which the contacts and elements within the casing of the apparatus are readily accessible.

The control shaft for the apparatus projects through the panel structure and the control knob which is attachable to the shaft functions not only as an adjustment means for the shaft, but also as a closure for the housing within which the contact elements are mounted.

In an attenuator in broadcast studios the contacts must be frequently cleaned to prevent accumulation of foreign matter between the contactor and the contacts for eliminating, insofar as possible, the introduction of noise in the broadcast program. The construction of my invention is well adapted for cleaning and adjustment upon removal of the control knob from the control shaft projecting from the front of the panel structure.

Referring to the drawings in more detail, reference character 1 designates a panel structure mounted on frame 2. The panel structure is apertured as indicated at 3. A plurality of screw holes 4 are drilled in the panel structure adjacent the aperture 3 therein and are countersunk at 5 to allow screws 9 to pass therethrough with the heads of the screws flush with or beneath the plane of the panel 1.

The electrical control apparatus is mounted within a metallic casing 6 having a peripheral annular flange 7 which is screw threaded at 8 to receive screws 9 which pass through panel 1 and engage the screw threaded recesses in the peripheral annular flange 7.

The rear of the casing 6 is apertured as indicated at 10 to allow the passage of the reduced section of the central cylindrical support 11. The central cylindrical support 11 has an annular shoulder 12 formed thereon adapted to abut against the interior end wall of the casing 6. The end of the central cylindrical support 11 is reduced in section and screw threaded as indicated at 14. The screw threaded end 14 of the central cylindrical support 11 projects beyond the rear of casing 6 and is engaged by cap screw 15. The opposite end of the central cylindrical support 11 is provided with an annular shoulder 16 and an end of reduced section as indicated at 17. An insulated disc 18 is carried by the end of the central cylindrical support 11 and abuts against shoulder 16 and extends flush with the peripheral annular flange 7. The insulated disc 18 carried by central cylindrical support 11 carries the insulated cylindrical member 19 which serves as insulation means for the electrical elements housed within the casing 6. In the example of my invention as illustrated, I have shown sets of resistors 20 having their axes extending parallel to the central axis of casing 6 and disposed on the exterior of the insulated cylindrical member 19. I also provide a set of resistors 21 mounted in a manner similar to the mounting of resistors 20 but arranged interiorly of the insulated cylindrical member 19. The insulated cylindrical member 19 is apertured to facilitate the passage of conductors therethrough as indicated generally at 22. Contacts 23 are carried by insulated disc 18 and project forward therefrom toward the front of panel 1 and connect through leads 24 with the resistors 20 and 21. The leads 24 serve both as connecting means and as mechanical supporting means for the resistors. The insulated disc 18 also supports the substantially semi-circular contact bar 25 mounted by means of screws 26 on the insulated disc 18 as illustrated in Fig. 3.

The central cylindrical support 11 has a hollow bore 27 extending therethrough for the passage of shaft 28. The shaft 28 is journalled in the hollow bore in the central cylindrical support 11 for rotative movement. The end of shaft 28 is recessed and screw threaded at 29 for receiving the securing screw 30. The securing screw 30 has an enlarged head which bears against the end of central cylindrical support 11 for maintaining the shaft 28 in position free for rotative movement.

The shaft 28 is free to revolve in the hollow bore 27 through the central cylindrical support 11 and is electrically grounded with respect to the casing 6. The shaft 28 carries a plate member 31 which is secured to the shaft by suitable means such as pin 32. A plate of insulation material 33 is secured to a plate 31 and is maintained in position by means of screws 34. The plate 33 has one corner cut away as indicated at 33a to provide a clearance space within which the multi-leaved inner switch arm 35 and the multi-leaved outer switch arm 36 are free to yield within narrow limits. The multi-leaved inner switch arm 35 and the multi-leaved outer switch arm 36 are secured to the plate of insulation material 33 by suitable means such as rivets 37. The multi-leaved inner switch arm 35 constitutes a contactor adapted to mechanically engage and sweep over the substantial semi-circular contact bar 25 and establish electrical connection therewith.

A substantially cylindrical closure member 38 is provided with a cylindrical skirt portion 39 having a diameter such that the skirt projects into the aperture 3 in panel 1 and is rotatable therein. A flange 40 projects normal to the skirt 39 immediately adjacent the front of panel 1 so that a substantially dust-tight closure is established across the front of the panel 10. The closure member 38 has a central bore 41 extending therethrough which receives the end of shaft 28 which is secured in position therein by means of set screw 42. The closure member 38 is of composite construction having a gripping portion 44 secured by screw 43 from the interior of closure member 38. Thus, the closure member 38 with gripping portion 44 constitutes a knob by which the electrical control apparatus may be adjusted from the front of the panel 1. Upon removal of the closure member 38 by loosening set screw 42 with respect to the end of shaft 28, the contacts 23 are exposed and cleaning of the contacts may be readily effected without disassembly of the control apparatus and while working from the front of the panel. Moreover, it is readily possible to gain access to the elements mounted within the casing 6 from the front of the panel by removing cap screw 15 from the rear of the casing, removing screw 30 and withdrawing shaft 28 with the screw arms carried thereby from the front of the panel. Disc 18 with the sets of electrical elements 20 and 21 associated therewith may next be withdrawn from the casing 6 from the front of the panel and replacement of the elements readily effected.

Leads 51 have sufficient length to permit withdrawal of the panel 10 with the electrical elements 20 and 21 connected with the contacts thereover. The rear of casing 6 is provided with an arcuate shaped aperture 45 across which arcuate shaped insulated plate 46 extends. The arcuate shaped insulated plate 46 is secured in position on the rear wall of casing 6 by means of screws 47. The insulated plate 46 carries lugs 48, 49 and 50 which provide terminal connecting means for the electrical elements and movable contactor of the control apparatus.

The principles of my invention when embodied in an attenuator used as a volume control in broadcast studios enable access to be had from the front of the panel upon removal of the knob so that the contacts may be frequently cleaned. This prevents introduction of noise in the broadcast program and has proven highly effective in operation.

While I have described my invention in one of its preferred embodiments, I desire that it be understood that modifications may be made and no limitations upon my invention are intended other than may be imposed by the scope of the appended claims.

What I claim as new and desire to secure by Letters Patent of the United States is as follows:

1. Control apparatus comprising a cup-shaped casing, a bushing member projecting axially of said casing, one end of said member extending through the end wall of said cup-shaped casing and adapted to be secured to said end wall, said member having an axially extending bore therethrough for receiving a rotatable shaft therein, a rotatable shaft operative within the bore, means for retaining said rotatable shaft in rotatable position with respect to the said member, means for securing the said end of said member with respect to said casing for fixing said member, an insulated panel supported by the opposite end of said member for closing the opposite end of said casing between the end wall of said casing and said panel, impedance elements mounted within said casing, contact elements carried by said insulated panel, electrical connections between said impedance elements and said contact elements, and contactors carried by said rotatable shaft and movable over the contact elements carried by said insulated panel.

2. Electrical control apparatus comprising a cup-shaped casing open at its forward end and having a central aperture in its rear wall, a bushing member having one end thereof extending through the aperture in the rear wall of said casing and adapted to be secured with respect to said casing, said member having an axial bore therethrough, an insulated panel connected with the other end of said member and forming a supporting means therefor with respect to said casing, a rotatable shaft extending through the axial bore in said member, means for retaining said rotatable shaft in rotatable position with respect to said member, means for securing said member in position with respect to said casing at the aperture in said casing for fixing said member and the panel connected therewith with respect to said casing, electrical contact means carried by said insulated panel, a contactor carried by said rotatable shaft and adjustable with respect to the electrical contact means carried by said insulated panel, manual control means mounted on said shaft, and a cover member overlying said contact means and the open end of said casing.

3. Panel mounted electrical control apparatus comprising a cup-shaped casing, a panel support for said casing having an opening therein coextensive with the mouth of said cup-shaped casing, manually controllable electric circuit means secured in said casing, and manual control means connected with said electric circuit means and having a detachable outer cover portion overlying the opening in said panel support; said electric circuit means including a separate panel structure having switch contacts thereon disposed substantially in the plane of said panel support and accessible for cleaning upon removal of the outer cover portion of said manual control means.

4. Panel mounted electrical control apparatus comprising a cup-shaped casing, a panel support for said casing having an opening therein coextensive with the mouth of said cup-shaped casing, manually controllable electric circuit means secured in said casing, and manual control means connected with said electric circuit means and having a detachable outer cover portion overlying the opening in said panel support; said electric circuit means including a separate panel structure having switch contacts thereon disposed substantially in the plane of said panel support and spaced from the wall of the opening in said panel support, and a skirt portion depending from the outer cover portion of said manual control means and extending into said opening between said contacts and the wall of said opening for effectively excluding dust and moisture from said contacts, said contacts being accessible for cleaning upon removal of the outer cover portion of said manual control means.

5. Panel mounted electrical control apparatus comprising a cup shaped casing, a panel support for said casing having an opening therein substantially coextensive with the mouth of said cup-shaped casing, electric circuit means secured in said casing and including a separate panel structure having switch contacts thereon disposed substantially in the plane of said panel support, and a detachable outer cover member overlying said contacts and the opening in said panel support, said contacts being accessible for cleaning upon removal of said outer cover member.

FRANK M. DAVIS.